UNITED STATES PATENT OFFICE.

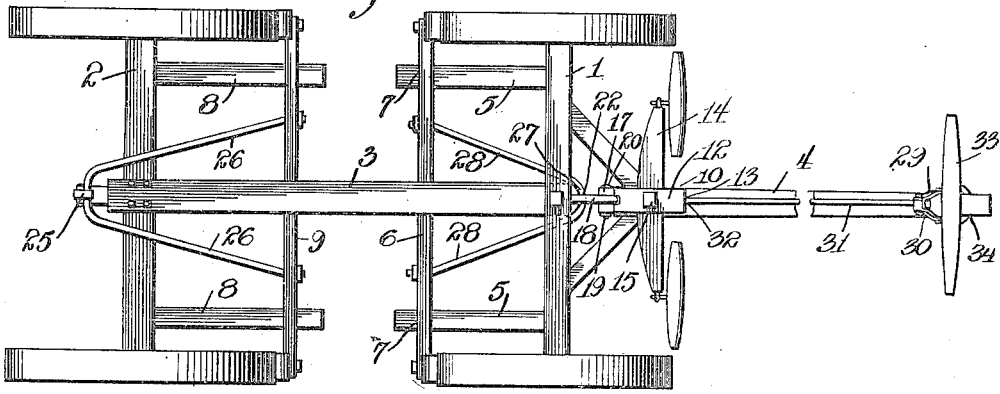
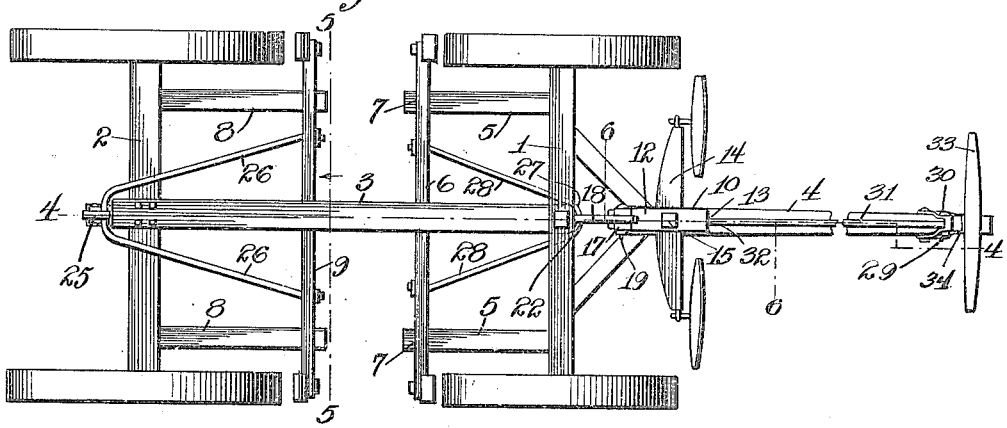
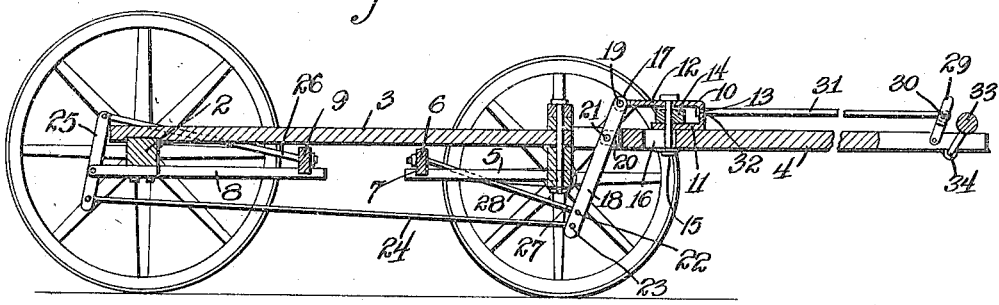

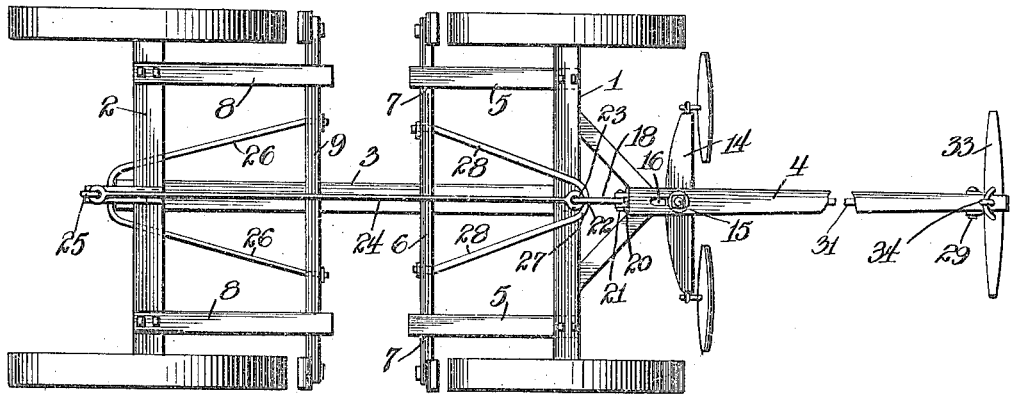
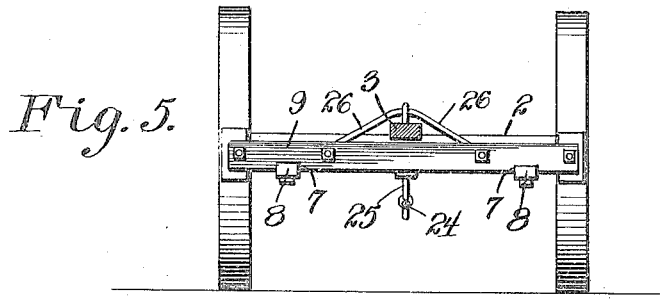
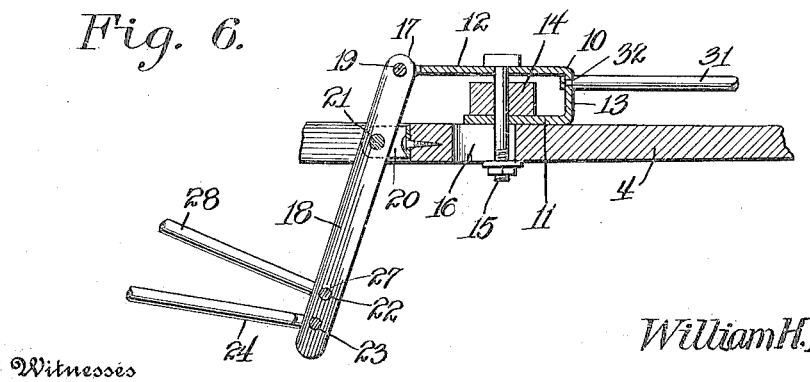

WILLIAM H. BENJAMIN, OF ROSEBURG, OREGON.

BRAKE.

1,135,872.   Specification of Letters Patent.   Patented Apr. 13, 1915.

Application filed June 25, 1913. Serial No. 775,801.

*To all whom it may concern:*

Be it known that I, WILLIAM H. BENJAMIN, a citizen of the United States, residing at Roseburg, in the county of Douglas and State of Oregon, have invented new and useful Improvements in Brakes, of which the following is a specification.

This invention relates to vehicle brakes; and it has for its object the provision of sliding braking beams carried by the front and rear bolsters and arranged so as to be simultaneously adjusted into operative applied positions against the wheels of the vehicle under direct influence of the draft animals.

Another object of the invention is the provision of controlling mechanism which will include a whiffletree operable under the normal pull of the animals to adjust and retain the brake beams in released positions and further the provision of a neck yoke control which will be positively engaged by the neck-yoke when the vehicle is traveling down grade and when pull is released from the whiffletree.

With these and other objects in view, the invention consists of certain novel features of construction, combination and arrangements of parts, as will be hereinafter described and claimed.

Figure 1 is a top plan view of a vehicle, showing the application of the brake thereto and illustrating the beams in inoperative or released positions; Fig. 2 is a similar view, showing the beams in applied positions under the action of the neck-yoke; Fig. 3 is a bottom plan view; Fig. 4 is a section on line 4—4 of Fig. 1; Fig. 5 is a section on line 5—5 of Fig. 1; and Fig. 6 is a section on line 6—6 of Fig. 1.

The vehicle herein illustrated is provided with the usual front and rear axles 1 and 2, a reach pole 3 and a draft pole 4. The front axle is provided with rearwardly extending guide bars 5, which slidably support a brake beam 6, the latter having recesses 7 therein which receive the bars 5 and whose walls engage against the opposite side edges of said bars 5, so that the brake beam is confined against lateral movement. The rear axle 2 is provided with guide bars 8, which are similar to the bars 5 and which are arranged to slidably support a rear brake beam 9 which is identical in construction with the bar 6.

The draft pole 4 is provided with draft animal actuated mechanism for applying and releasing the brake beams 6 and 9 respectively and as illustrated said means comprises a whiffletree support 10 which is slidable on the draft pole on the upper side thereof and which is shown to consist of a single piece of metal bent in substantially U-form, so as to provide superimposed portions 11 and 12 of varying lengths and a connecting front vertical portion 13. The intermediate portion of the whiffletree 14 extends through the member 10, and as illustrated a pivot pin 15 of suitable well known design is extended through the superimposed portion 11 and 12 and through the intermediate portion of the whiffletree and through a vertically extending relatively long slot 16 in the draft pole, so as to permit the member 10 to slide freely under the action of the draft animals. The upper portion 12 of the member 10 terminates in rear loops or knuckles 17 which receive therebetween the upper end of a rocking lever 18. A pin 19 is extended through the knuckles and through the upper end of the rocking lever. The rocking lever is pivotally mounted as at 21, in a bracket 20 attached to the rear end of the pole or tongue 4. The lower end of the rocking lever 18 is provided with passages 22 and 23, the latter receiving a draft rod 24 whose rear end is connected operatively with the lower end of a rocking lever 25 on the rear axle 2. The upper end of the lever 25 operatively receives an actuating member having branches 26 terminally lying beyond the sides of the longitudinal center of the vehicle and connected with the rear brake beam 9. The upper passage 22 of the rocking lever 18 receives the bight 27 of an actuating member which is provided with branches 28 whose rear ends are connected operatively with the front brake beam 6. From this construction it is evident that when pull is applied to the whiffletree under the action of the draft animals, the beams 6 and 9 will be simultaneously moved in directions toward each other and as a consequence they will be drawn from engagement from the wheels of the vehicle.

The neck-yoke control which is only used when the vehicle is advancing down grade, comprises a rocking yoke 29 on the forward end of the draft pole. The yoke has pivoted thereto, as at 30, the forward end of the draft rod 31, the rear end of the draft rod having connection at 32 with the vertical portion 13 of the sliding member 10 so that movements imparted to the yoke under the action of the draft animals will be transmitted to the member 10 and then finally to the brake beams 6 and 9 for a direct application of the latter to the wheels of the vehicle. The neck yoke 33 is mounted at 34 for sliding movements on the tip of the draft pole 4 and at a point immediately in advance of the rocking yoke as illustrated, so that when the vehicle is traveling down grade the rear pull which is applied to the neck yoke will be transmitted to the rocking yoke and then to the member 10, as is evident.

Under the normal pull of the draft animals, the whiffletree will be actuated to release the beams 6 and 9 simultaneously while rear pressure against the neck yoke when the weight of the vehicle and the load are applied directly against the draft animals will immediately effect a direct application of the beams 6 and 9 against the wheels of the vehicle. In this manner controlling movements of the brake beams are rendered positively automatical. Through the peculiar arrangement of the draft connections of the brake beams 6 and 9 with the rocking lever 18, and through the fact that the brake beams are carried by the axles of the vehicle it is seen that the front axle may be turned without resulting in a general derangement of the companion beams 6 and 9.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as claimed.

Having thus described my invention, what I claim is:—

In a vehicle, in combination with a front axle, a rear axle and a reach connecting them, rearwardly extending guide bars secured to the front axle, forwardly extending guide bars secured to the rear axle, brake beams movable longitudinally on said guide bars, hounds attached to the front axle, a tongue attached to the hounds, a rocking lever pivotally mounted at the rear end of the tongue, rods connecting the lower portion of the rocking lever to the front brake beam, a whiffletree supporting element mounted on the tongue for longitudinal movement and connected to the upper end of said rocking lever, a neck yoke connected to the tongue for movement longitudinally thereof, a lever mounted on the tongue and actuated by the neck yoke, a rod connecting said lever to the whiffle tree support, a rear rocking lever mounted on a support with which the rear axle is provided, rods connecting the upper end of the last named rocking lever to the rear brake beam, and a rod connecting the lower ends of said rocking lever.

In testimony whereof I affix my signature in presence of two witnesses.

WILLIAM H. BENJAMIN.

Witnesses:
WM. A. FRATER,
G. W. RAPP.

Copies of this patent may be obtained for five cents each, by addressing the "Commissioner of Patents, Washington, D. C."